Figure 1:
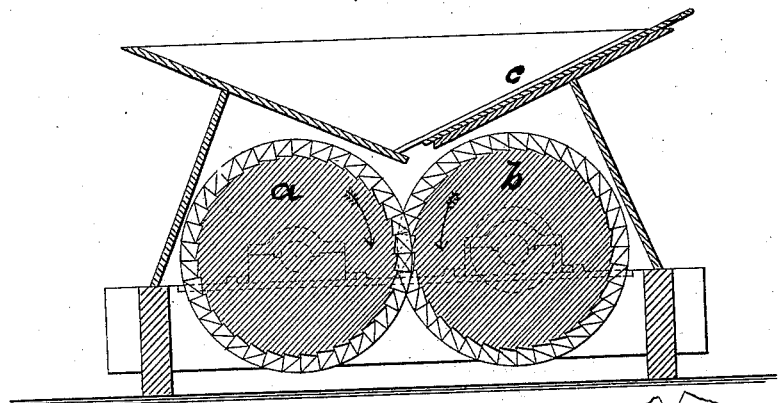

D. C. NEWELL.
Crushing and Grinding Rolls.

No. 203,364. Patented May 7, 1878.

WITNESSES.

Walter Pell

Wm Kemble Hall.

Darius C. Newell

INVENTOR.

UNITED STATES PATENT OFFICE.

DARIUS C. NEWELL, OF YONKERS, NEW YORK.

IMPROVEMENT IN CRUSHING AND GRINDING ROLLS.

Specification forming part of Letters Patent No. 203,364, dated May 7, 1878; application filed November 13, 1877.

*To all whom it may concern:*

Be it known that I, DARIUS C. NEWELL, of Yonkers, in the State of New York, have invented a certain new and useful Improvement in Grinding-Mills, of which the following is a specification:

The said invention relates to an improvement in the grinding-mills for which Letters Patent of the United States No. 196,100 were issued to me on the 16th day of October, 1877, and consisting of two rollers running together at different speeds, so that the grinding is effected by the material passing between them, and at a speed at least equal to that of the more slowly-moving roller, in order that the material cannot be heated by the mill becoming choked.

Instead of making the teeth in the peripheries of a series of interlocking ridges or angular rings on the cylindrical surfaces of the rollers, the present invention consists in making shallow teeth in the angular sides of the rings, of just sufficient depth to effect a hold on the material to be ground, without allowing any of it to pass unground.

To enable others skilled in the arts to which it appertains to make and use my invention, I will proceed to describe its construction and operation, with reference to the drawing.

Figure 2:
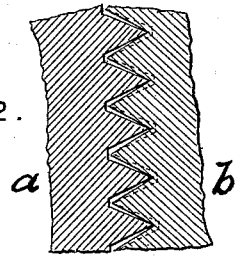
Figure 3:
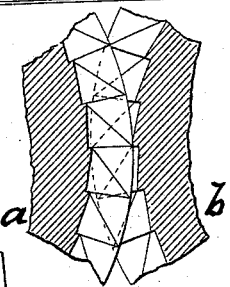
Figure 4:
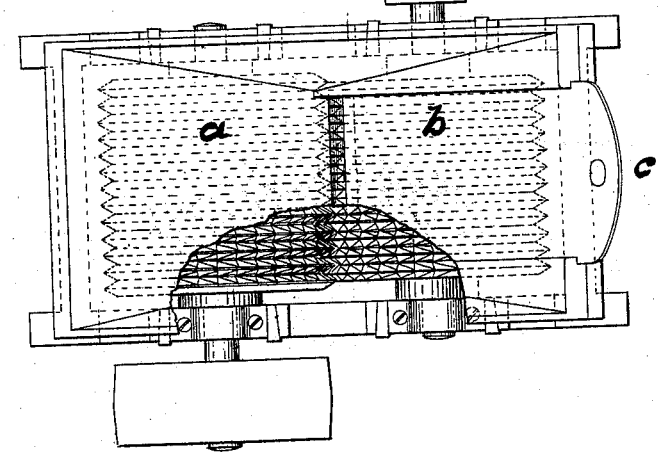

Figure 1 is a sectional elevation of the machine. Figs. 2 and 3 are enlarged views of the teeth and the interlocking surfaces of the rollers. Fig. 4 is a plan of the machine, with a portion of the hopper broken out to exhibit the rollers.

The slow roller *a* runs with the fast roller *b*, and both have the side surfaces of their angular ridges cut with triangular teeth or corresponding cavities, that taper in depth and width from the base outward, the intention being to hold the material with the slow roller and to cut and crush it with the fast one, without having the cavity that forms the tooth or detent large enough to permit the material to escape unground in its passage between the rotating rollers.

Instead of having the angular teeth or detents that are shown in the drawing, the sides of the angular rings may be grooved either radially or circularly by forming ridges between which the material may partially sink, so that it may be acted upon by the fast roller as it is held and carried through by the slow one. The triangular rings or ridges upon which the teeth are cut may be made higher and narrower, and therefore more acute, than those shown in the drawing, when it is desired to cut or break the material in small pieces before it is ground; or they may be made lower and wider and more obtuse, as may be desired or found effective for the purpose intended.

The relative positions of the rollers may be determined by keys or screws at the bearings of the journals on which they run; and one of them may be fitted with spring-bearings, to yield when anything too refractory for the strength of the mill should get between the rollers.

The slide *c* in the hopper regulates the supply to the rollers of the material to be ground.

I claim as my invention—

The combination of a grinding-roller, *a*, and a feed-roller, *b*, geared to run at different speeds in opposite directions, and having teeth or detents on the sides of the angular ridges, substantially as described.

DARIUS C. NEWELL.

Witnesses:
WALTER PELL,
WM. KEMBLE HALL.